United States Patent
Crucs

(10) Patent No.: US 8,135,889 B2
(45) Date of Patent: Mar. 13, 2012

(54) DIRECT CONNECTION SINGLE USER-INTERFACE CONTROL OF MULTIPLE COMPUTERS AND DISPLAYS

(75) Inventor: Kevin M. Crucs, Copley, OH (US)

(73) Assignee: Apteryx, Inc., Akron, OH (US)

( * ) Notice: Subject to any disclaimer, the term of this patent is extended or adjusted under 35 U.S.C. 154(b) by 179 days.

(21) Appl. No.: 12/488,877

(22) Filed: Jun. 22, 2009

(65) Prior Publication Data

US 2010/0325322 A1 Dec. 23, 2010

(51) Int. Cl.
*G06F 3/01* (2006.01)
(52) U.S. Cl. ............................................. 710/62; 710/51
(58) Field of Classification Search ........................ None
See application file for complete search history.

(56) References Cited

U.S. PATENT DOCUMENTS

| | | | | |
|---|---|---|---|---|
| 5,748,189 A * | 5/1998 | Trueblood | .................... | 715/755 |
| 5,835,090 A * | 11/1998 | Clark et al. | .................... | 715/764 |
| 6,075,571 A * | 6/2000 | Kuthyar et al. | ................ | 348/584 |
| 6,411,302 B1 * | 6/2002 | Chiraz | ........................... | 345/545 |
| 6,473,101 B1 * | 10/2002 | Grigor et al. | .................. | 715/784 |
| 6,727,918 B1 * | 4/2004 | Nason | ............................ | 715/791 |
| 7,289,084 B2 * | 10/2007 | Lesniak | ........................ | 345/1.1 |
| 7,567,233 B2 * | 7/2009 | Garibaldi et al. | ............. | 345/157 |
| 7,747,960 B2 * | 6/2010 | Garibaldi et al. | ............. | 715/767 |
| 8,046,709 B2 * | 10/2011 | Lee et al. | ....................... | 715/778 |
| 2006/0253639 A1 * | 11/2006 | Lee et al. | ...................... | 710/313 |
| 2007/0033289 A1 * | 2/2007 | Nuyttens et al. | ............. | 709/230 |
| 2009/0122011 A1 * | 5/2009 | Timokhin et al. | ............. | 345/163 |
| 2009/0128491 A1 * | 5/2009 | Katayama et al. | ............ | 345/163 |
| 2010/0060571 A1 * | 3/2010 | Chen et al. | ..................... | 345/157 |
| 2010/0315328 A1 * | 12/2010 | Marcus et al. | ................. | 345/156 |

OTHER PUBLICATIONS

Single Control, internet screen shot from http://www.apteryxware.com/singlecontrol, Apr. 13, 2009, 10 pages.

* cited by examiner

*Primary Examiner* — Cheng-Yuan Tseng
(74) *Attorney, Agent, or Firm* — Hahn Loeser & Parks LLP

(57) ABSTRACT

Methods, systems, and devices providing single user-interface control of multiple computers and displays. Direct communication links to multiple computers are provided to automatically transmit peripheral computer device position and peripheral computer device commands to one of the multiple computers using, for example, a single computer mouse and/or a single computer keyboard device, based on a configuration map which maps mouse position to display position of the multiple computers and displays as the current mouse position is automatically tracked.

60 Claims, 8 Drawing Sheets

DIRECT CONNECTION SINGLE USER-INTERFACE CONTROL OF MULTIPLE COMPUTERS AND DISPLAYS

TECHNICAL FIELD

Certain embodiments relate to computer user interfacing. More particularly, certain embodiments relate to directly and automatically controlling multiple computers and displays from a single computer user-interface (e.g., a peripheral computer device such as a keyboard and/or a computer mouse).

BACKGROUND

Previously, methods and devices have been provided to connect a keyboard and a mouse to multiple computers and displays. Such methods and devices include using a keyboard/video/mouse (KVM) switch or a keyboard/mouse (KM) switch, or employing software-intensive methods over a network. However, such previous methods and devices have their limitations and drawbacks.

Further limitations and disadvantages of conventional, traditional, and proposed approaches will become apparent to one of skill in the art, through comparison of such systems and methods with the subject matter of the present application as set forth in the remainder of the present application with reference to the drawings.

SUMMARY

An embodiment of the present invention comprises a method providing single user-interface control of multiple computers and displays. The method includes generating a configuration map that maps mouse position of a computer mouse to display position of at least two computers and storing the configuration map in a computer keyboard device operatively connected to the computer mouse and the at least two computers. The method further includes automatically tracking a current mouse position of the computer mouse using the computer keyboard device as a user manipulates the computer mouse and automatically associating the current mouse position with one of the at least two computers according to the configuration map using the computer keyboard device. The method also includes automatically transmitting the current mouse position, any current mouse command, and any current keyboard command to the associated computer via a direct communication link between the computer keyboard device and the associated computer. The method may further include the associated computer automatically responding to the current mouse position, any current mouse command, and any current keyboard command. The method may also include automatically associating a new current mouse position with another of the at least two computers according to the configuration map using the computer keyboard device. The method may further include automatically transmitting the new current mouse position, any new current mouse command, and any new current keyboard command to the other associated computer via another direct communication link between the computer keyboard device and the other associated computer. The method may also include the other associated computer automatically responding to the new current mouse position, any new current mouse command, and any new current keyboard command. The direct communication link may include a direct hardware connection between the computer keyboard device and the associated computer. Alternatively, the direct communication link may include a direct wireless connection between the computer keyboard device and the associated computer. The other direct communication link may include a direct hardware connection between the computer keyboard device and the other associated computer. Alternatively, the other direct communication link may include a direct wireless connection between the computer keyboard device and the other associated computer. Each of the at least two computers may include at least one display device.

Another embodiment of the present invention comprises a method providing single user-interface control of multiple computers and displays. The method includes generating a configuration map that maps mouse position of a computer mouse to display position of at least two computers and storing the configuration map in a user-interface demultiplexer device operatively connected to a computer keyboard device, the computer mouse, and the at least two computers. The method further includes automatically tracking a current mouse position of the computer mouse using the user-interface demultiplexer device as a user manipulates the computer mouse and automatically associating the current mouse position with one of the at least two computers according to the configuration map using the user-interface demultiplexer device. The method also includes automatically transmitting the current mouse position, any current mouse command, and any current keyboard command to the associated computer via a direct communication link between the user-interface demultiplexer device and the associated computer. The method may further include the associated computer automatically responding to the current mouse position, any current mouse command, and any current keyboard command. The method may also include automatically associating a new current mouse position with another of the at least two computers according to the configuration map using the user-interface demultiplexer device. The method may further include automatically transmitting the new current mouse position, any new current mouse command, and any new current keyboard command to the other associated computer via another direct communication link between the user-interface demultiplexer device and the other associated computer. The method may also include the other associated computer automatically responding to the new current mouse position, any new current mouse command, and any new current keyboard command. The direct communication link may include a direct hardware connection between the user-interface demultiplexer device and the associated computer. Alternatively, the direct communication link may include a direct wireless connection between the user-interface demultiplexer device and the associated computer. The other direct communication link may include a direct hardware connection between the user-interface demultiplexer device and the other associated computer. Alternatively, the other direct communication link may include a direct wireless connection between the user-interface demultiplexer device and the other associated computer. Each of the at least two computers may include at least one display device.

A further embodiment of the present invention comprises a system providing single user-interface control of multiple computers and displays. The system includes a computer mouse, at least two computers, and a configuration map that maps mouse position of the computer mouse to display position of the at least two computers. The system further includes a computer keyboard device storing the configuration map and being operatively connected to each of the at least two computers via direct communication links from the at least two computers to the computer keyboard device. The computer keyboard device is further operatively connected to the computer mouse. The computer keyboard device is capable of automatically tracking a current mouse position of the computer mouse as a user manipulates the computer mouse and automatically associating the current mouse position with one of the at least two computers according to the configuration map. The computer keyboard device is further capable of automatically transmitting the current mouse position, any current mouse command, and any current keyboard command to the associated computer via a direct communication link, of the direct communication links, between the computer keyboard device and the associated computer. The computer keyboard device is also capable of automatically associating a new current mouse position with another of the at least two computers according to the configuration map and automatically transmitting the new current mouse position, any new current mouse command, and any new current keyboard command to the other associated computer via another direct communication link, of the direct communication links, between the computer keyboard device and the other associated computer. The direct communication link may include a direct hardware connection between the computer keyboard device and the associated computer. Alternatively, the direct communication link may include a direct wireless connection between the computer keyboard device and the associated computer. The other direct communication link may include a direct hardware connection between the computer keyboard device and the other associated computer. Alternatively, the other direct communication link may include a direct wireless connection between the computer keyboard device and the other associated computer. Each of the at least two computers may include at least one display device.

Another embodiment of the present invention comprises a system providing single user-interface control of multiple computers and displays. The system includes a computer mouse, at least two computers, a configuration map that maps mouse position of the computer mouse to display position of the at least two computers, and a computer keyboard device. The system further includes a user-interface demultiplexer device storing the configuration map and being operatively connected to each of the at least two computers via direct communication links from the at least two computers to the user-interface demultiplexer device. The user-interface demultiplexer device is further operatively connected to the computer keyboard device and the computer mouse. The user-interface demultiplexer device is capable of automatically tracking a current mouse position of the computer mouse as a user manipulates the computer mouse. The user-interface demultiplexer device is also capable of automatically associating the current mouse position with one of the at least two computers according to the configuration map. The user-interface demultiplexer device is further capable of automatically transmitting the current mouse position, any current mouse command, and any current keyboard command to the associated computer via a direct communication link, of the direct communication links, between the user-interface demultiplexer device and the associated computer. The user-interface demultiplexer device is also capable of automatically associating a new current mouse position with another of the at least two computers according to the configuration map and automatically transmitting the new current mouse position, any new current mouse command, and any new current keyboard command to the other associated computer via another direct communication link, of the direct communication links, between the user-interface demultiplexer device and the other associated computer. The direct communication link may include a direct hardware connection between the user-interface demultiplexer device and the associated computer. Alternatively, the direct communication link may include a direct wireless connection between the user-interface demultiplexer device and the associated computer. The other direct communication link may include a direct hardware connection between the user-interface demultiplexer device and the other associated computer. Alternatively, the other direct communication link may include a direct wireless connection between the user-interface demultiplexer device and the other associated computer. Each of the at least two computers may include at least one display device.

Another embodiment of the present invention comprises a smart computer keyboard device. The smart computer keyboard device includes means for keyboarding and means for interfacing to a computer mouse. The smart computer keyboard device further includes means for automatically tracking a current mouse position of the computer mouse as a user manipulates the computer mouse, and means for mapping mouse position of the computer mouse to display position of at least two computers. The smart computer keyboard device also includes means for automatically directing the current mouse position of the computer mouse, any current mouse command of the computer mouse, and any current keyboard command of the means for keyboarding directly to one of the at least two computers based on the means for mapping.

A further embodiment of the present invention comprises a smart user-interface demultiplexer device. The smart user-interface demultiplexer device includes means for interfacing to a computer keyboard and means for interfacing to a computer mouse. The smart user-interface demultiplexer device further includes means for automatically tracking a current mouse position of the computer mouse as a user manipulates the computer mouse, and means for mapping mouse position of the computer mouse to display position of at least two computers. The smart user-interface demultiplexer device also includes means for automatically demultiplexing the current mouse position of the computer mouse, any current mouse command of the computer mouse, and any current keyboard command of the computer keyboard directly to one of the at least two computers based on the means for mapping.

Another embodiment of the present invention comprises a method of providing single user-interface control of multiple computers and displays. The method includes generating a configuration map that maps device position of a first peripheral computer device to display position of at least two computers. The method further includes storing the configuration map in a second peripheral computer device operatively connected to the first peripheral computer device and the at least two computers. The method also includes automatically tracking a current device position of the first peripheral computer device using the second peripheral computer device as a user manipulates the first peripheral computer device. The method further includes automatically associating the current device position with one of the at least two computers according to the configuration map using the second peripheral computer device. The method also includes automatically transmitting the current device position, any current first peripheral computer device command, and any current second peripheral computer device command to the associated computer via a direct communication link between the second peripheral computer device and the associated computer. The method further includes the associated computer automatically responding to the current device position, the any current first peripheral computer device command, and the any second peripheral computer device command. Each of the at least two computers may include at least one display device. The first peripheral computer device may include, for example, any one of a movable computer mouse, a touchpad mouse, a keyboard, an integrated mouse and keyboard, an electronic pen or stylus, a 3D orb, a track ball, a tablet computer, a joy stick, a gaming wand, a user-interface demultiplexer device, and a scanner. The second peripheral computer device may include, for example, any one of a movable computer mouse, a touchpad mouse, a keyboard, an integrated mouse and keyboard, an electronic pen or stylus, a 3D orb, a track ball, a tablet computer, a joy stick, a gaming wand, a user-interface demultiplexer device, and a scanner. The first peripheral computer device and the second peripheral computer device may be a single integrated unit, for example. The single integrated unit may include, for example, one of a movable computer mouse, a touchpad mouse, a keyboard, an electronic pen or stylus, a 3D orb, a track ball, a tablet computer, a joy stick, a gaming wand, a user-interface demultiplexer device, and a scanner. The single integrated unit may include, for example, one of a keyboard/movable mouse combination, a keyboard/touch pad mouse combination, a keyboard/electronic pen combination, a tablet computer/touch pad mouse combination, a keyboard/3D orb combination, and a tablet computer/track ball combination. Other combinations are possible as well. The first peripheral computer device may include, for example, one of a keyboard/movable mouse combination, a keyboard/touch pad mouse combination, a keyboard/electronic pen combination, a tablet computer/touch pad mouse combination, a keyboard/3D orb combination, and a tablet computer/track ball combination. Other combinations are possible as well. The second peripheral computer device may include, for example, one of a keyboard/movable mouse combination, a keyboard/touch pad mouse combination, a keyboard/electronic pen combination, a tablet computer/touch pad mouse combination, a keyboard/3D orb combination, and a tablet computer/track ball combination. Other combinations are possible as well. The method may further include automatically associating a new current device position with another of the at least two computers according to the configuration map using the second peripheral computer device. The method may also include automatically transmitting the new current device position, any new current first peripheral computer device command, and any new second peripheral computer device command to the another associated computer via another direct communication link between the second peripheral computer device and the another associated computer. The method may further include the another associated computer automatically responding to the new current device position, the any new current first peripheral computer device command, and the any new current second peripheral computer device command. The direct communication link may include a direct hardware connection between the second peripheral computer device and the associated computer or a direct wireless connection between the second peripheral computer device and the associated computer. The another direct communication link may include a direct hardware connection between the second peripheral computer device and the another associated computer or a direct wireless connection between the second peripheral computer device and the another associated computer.

A further embodiment of the present invention comprises a system providing single user-interface control of multiple computers and displays. The system includes a first peripheral computer device, at least two computers, a configuration map that maps device position of the first peripheral computer device to display position of the at least two computers, and a second peripheral computer device storing the configuration map and being operatively connected to each of the at least two computers via direct communication links from the at least two computers to the second peripheral computer device. The second peripheral computer device is also operatively connected to the first peripheral computer device. The second peripheral computer device is capable of automatically tracking a current device position of the first peripheral computer device as a user manipulates the first peripheral computer device. The second peripheral computer device is capable of automatically associating the current device position with one of the at least two computers according to the configuration map. The second peripheral computer device is capable of automatically transmitting the current device, position, any current first peripheral computer device command, and any current second peripheral computer device command, to the associated computer via a direct communication link, of the direct communication links, between the second peripheral computer device and the associated computer. Each of the at least two computers may include at least one display device. The first peripheral computer device may include, for example, any one of a movable computer mouse, a touchpad mouse, a keyboard, an integrated mouse and keyboard, an electronic pen or stylus, a 3D orb, a track ball, a tablet computer, a joy stick, a gaming wand, a user-interface demultiplexer device, and a scanner. The second peripheral computer device may include, for example, any one of a movable computer mouse, a touchpad mouse, a keyboard, an integrated mouse and keyboard, an electronic pen or stylus, a 3D orb, a track ball, a tablet computer, a joy stick, a gaming wand, a user-interface demultiplexer device, and a scanner. The first peripheral computer device and the second peripheral computer device may be a single integrated unit, for example. The single integrated unit may include, for example, one of a movable computer mouse, a touchpad mouse, a keyboard, an electronic pen or stylus, a 3D orb, a track ball, a tablet computer, a joy stick, a gaming wand, a user-interface demultiplexer device, and a scanner. The single integrated unit may include, for example, one of a keyboard/movable mouse combination, a keyboard/touch pad mouse combination, a keyboard/electronic pen combination, a tablet computer/touch pad mouse combination, a keyboard/3D orb combination, and a tablet computer/track ball combination. Other combinations are possible as well. The first peripheral computer device may include, for example, one of a keyboard/movable mouse combination, a keyboard/touch pad mouse combination, a keyboard/electronic pen combination, a tablet computer/touch pad mouse combination, a keyboard/3D orb combination, and a tablet computer/track ball combination. Other combinations are possible as well. The second peripheral computer device may include, for example, one of a keyboard/movable mouse combination, a keyboard/touch pad mouse combination, a keyboard/electronic pen combination, a tablet computer/touch pad mouse combination, a keyboard/3D orb combination, and a tablet computer/track ball combination. Other combinations are possible as well. The second peripheral computer device may be further capable of automatically associating a new current device position with another of the at least two computers according to the configuration map, and automatically transmitting the new current device position, any new current first peripheral computer device command, and any new current second peripheral computer device command to the another associated computer via another direct communication link, of the direct communication links, between the second peripheral computer device and the another associated computer. The direct communication link may include a direct hardware connection between the second peripheral computer device and the associated computer, or a direct wireless connection between the second peripheral computer device and the associated computer. The another direct communication link may include a direct hardware connection between the second peripheral computer device and the another associated computer, or a direct wireless connection between the second peripheral computer device and the another associated computer.

Another embodiment of the present invention comprises a smart peripheral computer device. The smart peripheral computer device includes means for automatically tracking a current device position of the smart peripheral computer device as a user manipulates the smart peripheral computer device. The smart peripheral computer device further includes means for mapping device position of the smart peripheral computer device to display position of at least two computers. The smart peripheral computer device also includes means for automatically directing the current device position of the smart peripheral computer device and any current command of the smart peripheral computer device directly to one of the at least two computers based on the means for mapping.

A further embodiment of the present invention comprises a smart user-interface demultiplexer device. The user-interface demultiplexer device includes means for interfacing to a peripheral computer device and means for automatically tracking a current device position of the peripheral computer device as a user manipulates the peripheral computer device. The user-interface demultiplexer device further includes means for mapping device position of the peripheral computer device to display position of at least two computers. The user-interface demultiplexer device also includes means for automatically demultiplexing the current device position of the peripheral computer device and any current command of the peripheral computer device directly to one of the at least two computers based on the means for mapping.

These and other novel features of the subject matter of the present application, as well as details of illustrated embodiments thereof, will be more fully understood from the following description and drawings.

DETAILED DESCRIPTION

Certain embodiments of the present invention are described herein with respect to a computer keyboard device and a computer mouse. However, other peripheral computer devices may also be applicable, in accordance with other embodiments of the present invention.

Figure 1:
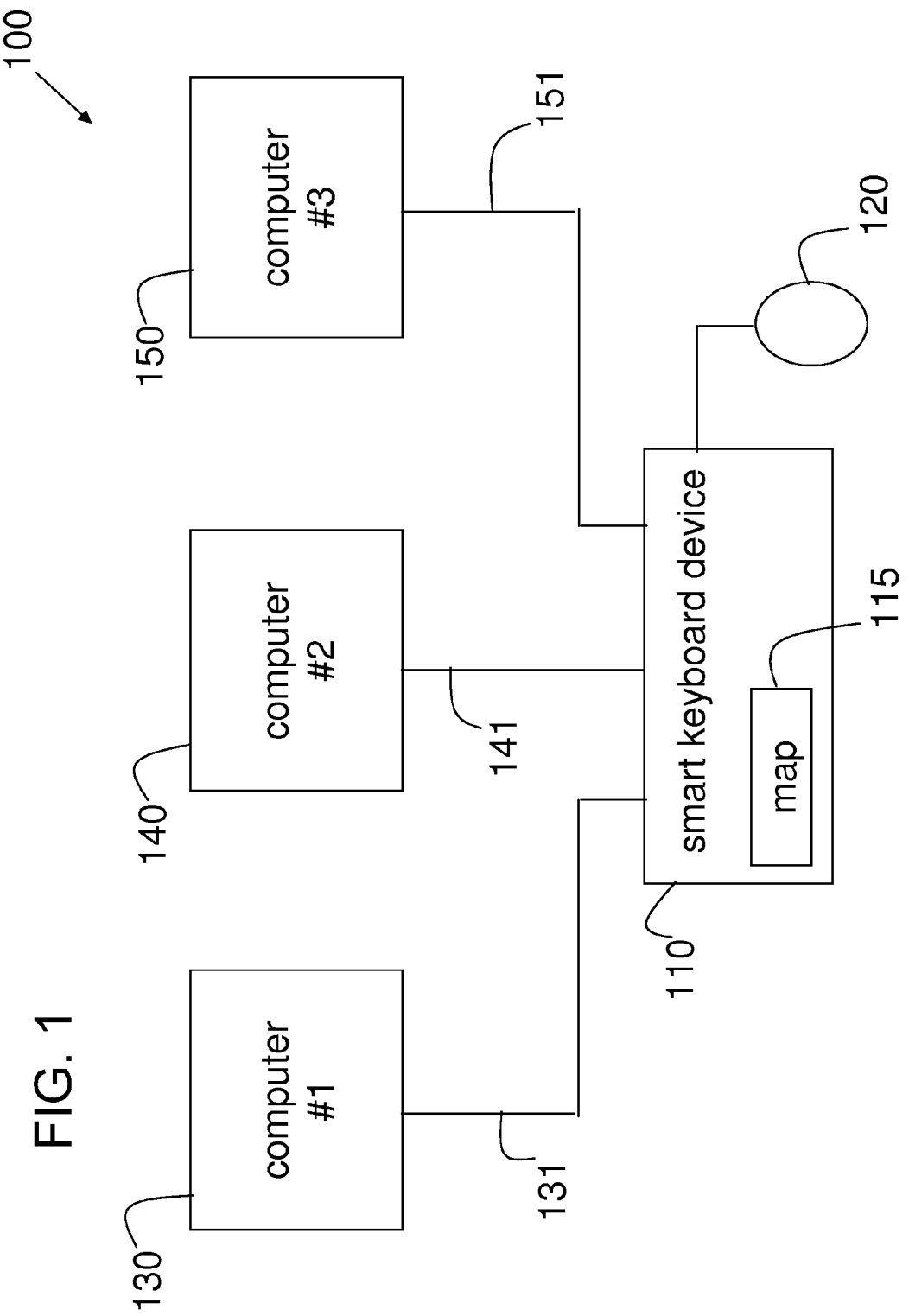
FIG. 1 illustrates a first example embodiment of a system for providing single user-interface control of multiple computers and displays.

FIG. 1 illustrates a first example embodiment of a system 100 for providing single user-interface control of multiple computers and displays. The system 100 includes a smart keyboard device 110 (i.e., a peripheral computer device) storing a configuration map 115, and a computer mouse 120 (i.e., a peripheral computer device) operatively connected to the keyboard device 110. The system 100 further includes a first computer 130, a second computer 140, and a third computer 150 each capable of being operatively connected to the smart keyboard device 110 via a direct communication link. Each computer 130, 140, and 150 may have one or more displays or monitors. Even though the system 100 of FIG. 1 illustrates an embodiment showing three computers, only two computers may be used, or more than three computers may be used, in accordance with other embodiments of the present invention.

The smart keyboard device 110 provides traditional keyboarding capability as well as an interface to the computer mouse 120 (e.g., a USB [universal serial bus] interface or a PS/2 interface). The smart keyboard device 110 is further capable of automatically tracking a current mouse position of the computer mouse 120, mapping mouse position of the computer mouse 120 to display position of at least two computers, and automatically directing the current mouse position of the computer mouse, any current mouse command of the computer mouse 120, and any current keyboard command of the smart keyboard device 110 directly to one of the computers.

The direct communication link 131 is a direct hardware connection (e.g., a USB cable or a PS/2 cable) between the smart keyboard device 110 and the first computer 130. The direct communication link 141 is a direct hardware connection (e.g., a USB cable or a PS/2 cable) between the smart keyboard device 110 and the second computer 140. The direct communication link 151 is a direct hardware connection (e.g., a USB cable or a PS/2 cable) between the smart keyboard device 110 and the third computer 150. In accordance with an embodiment of the present invention, the smart keyboard device 110 functionally connects to only one of the computers at a time, dependent upon a current tracked position of the computer mouse 120 with respect to the configuration map 115, as will be discussed in more detail herein.

Figure 2:
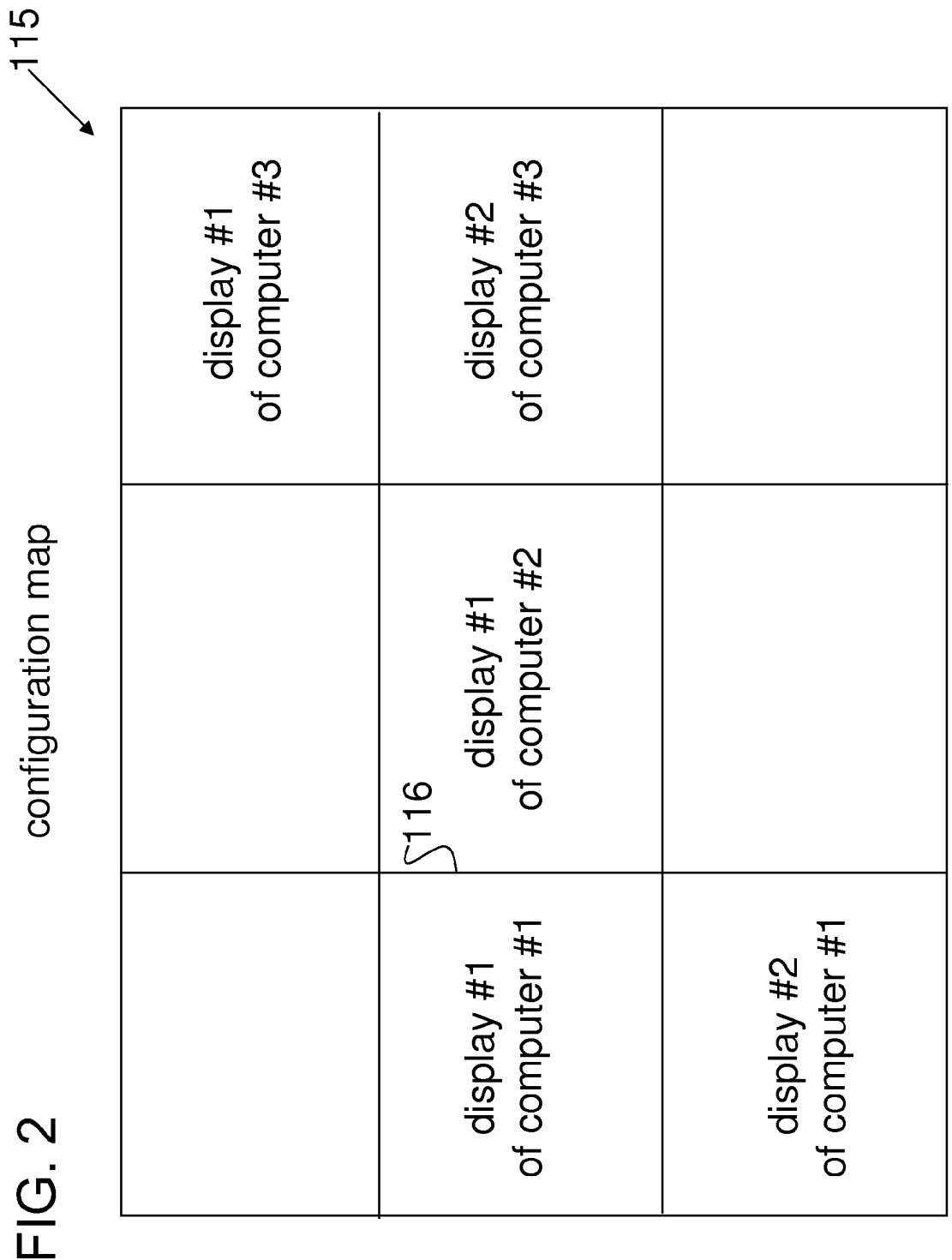
FIG. 2 illustrates a first example embodiment of a configuration map used in the system of FIG. 1.

FIG. 2 illustrates a first example embodiment of a configuration map 115 used in the system 100 of FIG. 1. The configuration map 115 is generated by a user using a configuration software routine or application within the smart keyboard device 110 in conjunction with, for example, one of the computers 130, 140, or 150. As such, the smart keyboard device 110 includes a processor for running the configuration software routine or application. The configuration software routine or application allows the user to define the dimensions of the matrix of the configuration map (e.g., 3×3) and then define how many displays each computer has and the relative locations of those displays with respect to each other, and store the resultant configuration map 115 in a memory of the keyboard device 110.

In FIG. 2, the configuration map 115 is a 3×3 matrix defining the relative display regions of the various computers as well as the absolute display region of any computer display. Referring to FIG. 2, the first computer 130 (computer #1) has two displays (display #1 and display #2). The second computer 140 (computer #2) has one display (display #1). The third computer 150 (computer #3) has two displays (display #1 and display #2). According to the configuration map 115, display #1 and display #2 of the first computer 130 are defined as being on the left side of the matrix with display #1 being above display #2, where display #1 and display #2 are defined at the middle and lower left relative matrix positions, respectively. Furthermore, display #1 of the second computer 140 is defined as being in the middle of the matrix. Finally, display #1 and display #2 of the third computer 150 are defined as being on the right side of the matrix with display #1 being above display #2, where display #1 and display #2 are defined at the upper and middle right relative matrix positions, respectively. These relative positions of the various displays defined by the user in the configuration map 115 should correspond, at least roughly, to the actual physical layout of the various computer displays in the real world for maximum user effectiveness.

The absolute (x, y) dimensions of each defined display region may vary from display to display and may be defined by the user when generating the configuration map 115. Such absolute display dimensions may depend on the actual physical characteristics of the displays being employed by the various computers, including display size, display resolution, and number of displays. In accordance with an embodiment of the present invention, the display characteristics may be read by the smart keyboard device 110 from each computer 130, 140, and 150 over each interface 131, 141, and 151 and used by the smart keyboard device 110 and the user when generating the configuration map 115 using the configuration software routine or application. Each computer 130, 140, and 150 may include, for example, an installed USB driver to provide the display characteristics.

The smart keyboard device 110 is capable of tracking the position of the computer mouse 120 with respect to the configuration map 115 using a control software routine or application. As the position of the computer mouse 120 is tracked by the smart keyboard device 110, the current position of the mouse is mapped to a position on one of the displays of one of the computers using the configuration map 115. For example, if the current mouse position corresponds to a position within the matrix region of the configuration map 115 defined for display #1 of computer #2 then, when the user of the mouse 120 moves the mouse far enough to the left, the displayed mouse cursor transitions from display #1 of computer #2 (i.e., computer 140) to display #1 of computer #1 (i.e., computer 130). Similarly, if the current mouse position is then moved far enough downward, the displayed mouse cursor transitions from display #1 of computer #1 (i.e., computer 130) to display #2 of computer #1 (i.e., computer 130). As a result, the relative movement of the computer mouse 120 coupled with the configuration map 120 as operated upon by the smart keyboard device 110 determines on which physical display of which computer the mouse cursor appears. The smart keyboard device 110 transmits the current mouse position to the appropriate computer.

As long as the mouse 120 moves only within the defined two-dimensional (x, y) boundaries of any one display for any one computer, as defined by the configuration map 115, then the mouse cursor is displayed at the current mouse position on that display and the mouse commands from the mouse 120 and keyboard commands from the smart keyboard device 110 are directed to that computer. Only when a display boundary line (e.g., boundary line 116) is crossed, as defined by the configuration map 115, will the displayed mouse cursor transition from one display to another. Furthermore, when the displayed mouse cursor transitions from one display to another, mouse commands from the mouse 120 and keyboard commands from the smart keyboard device 110 are automatically re-directed to the corresponding computer and display as defined by the configuration map 115. The re-direction capability is accomplished by turning off a direct communication link from the smart keyboard device 110 to the current computer, and turning on another direct communication link from the smart keyboard device 110 to another computer. For example, the direct communication link 141 may be turned off between the keyboard device 110 and computer #2 (i.e., computer 140), and the direct communication link 131 may be turned on between the keyboard device 110 and computer #1 (i.e., computer 130) as the mouse 120 is moved to transition between the two. The re-direction is accomplished automatically, via the control software routine or application, without the user having to manually flip a switch or push a button, for example.

In accordance with an embodiment of the present invention, the automatic re-direction capability is facilitated by a type of de-multiplexing capability within the smart keyboard device 110, where signals or data are directed to one of many outputs. The general concept of de-multiplexing is well known in the electronic arts.

Figure 3:
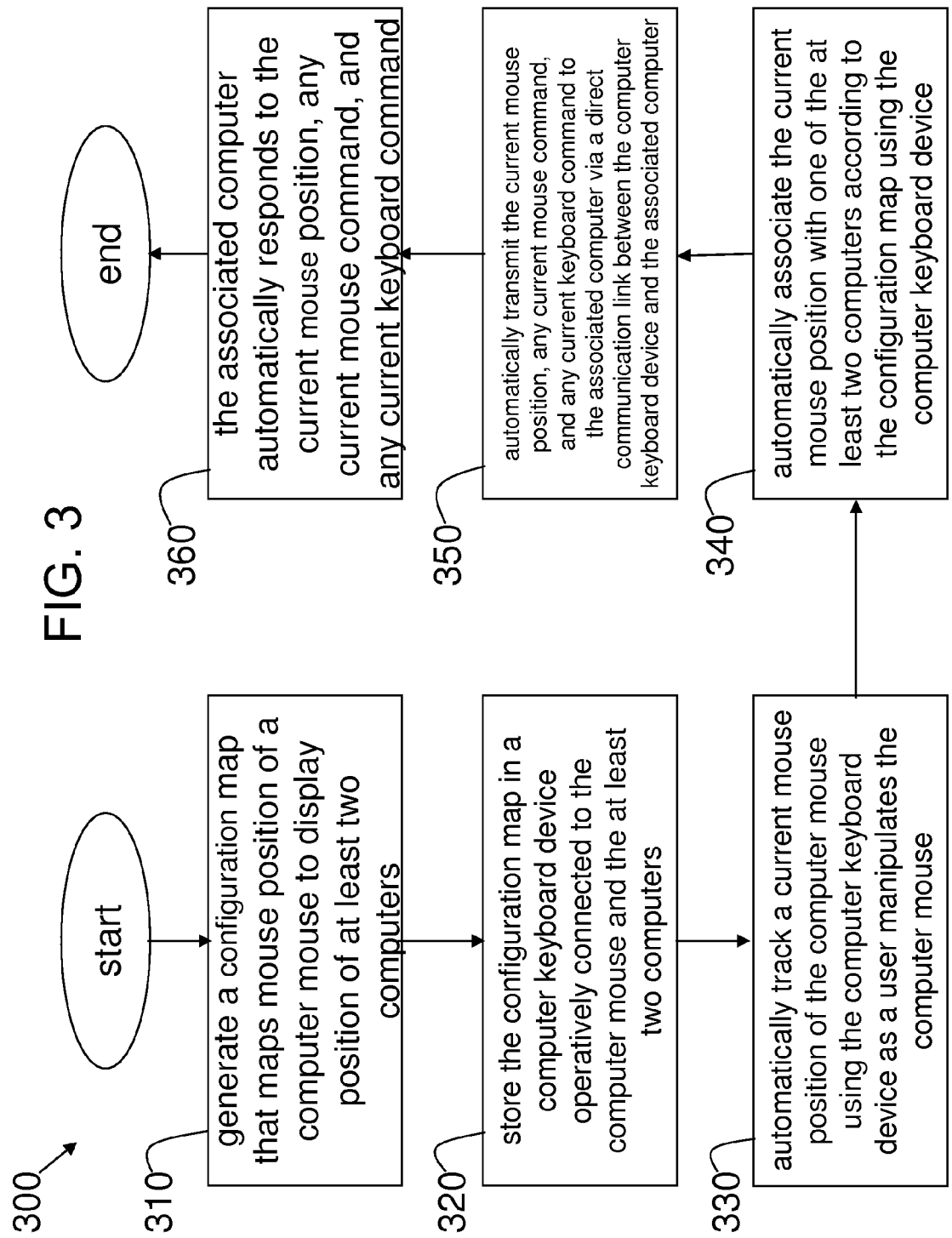
FIG. 3 is a flow chart of an embodiment of a method for providing single user-interface control of multiple computers and displays using the system of FIG. 1.

FIG. 3 is a flow chart of an embodiment of a method 300 for providing single user-interface control of multiple computers and displays using the system 100 of FIG. 1. In step 310, a configuration map 115 is generated that maps mouse position of a computer mouse 120 to display position of at least two computers. In step 320, the configuration map 115 is stored in a computer keyboard device 110 operatively connected to the computer mouse 120 and the at least two computers. In step 330, a current mouse position of the computer mouse 120 is automatically tracked using the computer keyboard device 110 as a user manipulates the computer mouse 120. In step 340, the current mouse position is automatically associated with one of the at least two computers according to the configuration map 115 using the computer keyboard device 110. In step 350, the current mouse position, any current mouse command, and any current keyboard command are automatically transmitted to the associated computer via a direct communication link between the computer keyboard device 110 and the associated computer. In step 360, the associated computer automatically responds to the current mouse position, any current mouse command, and any current keyboard command.

Figure 4:
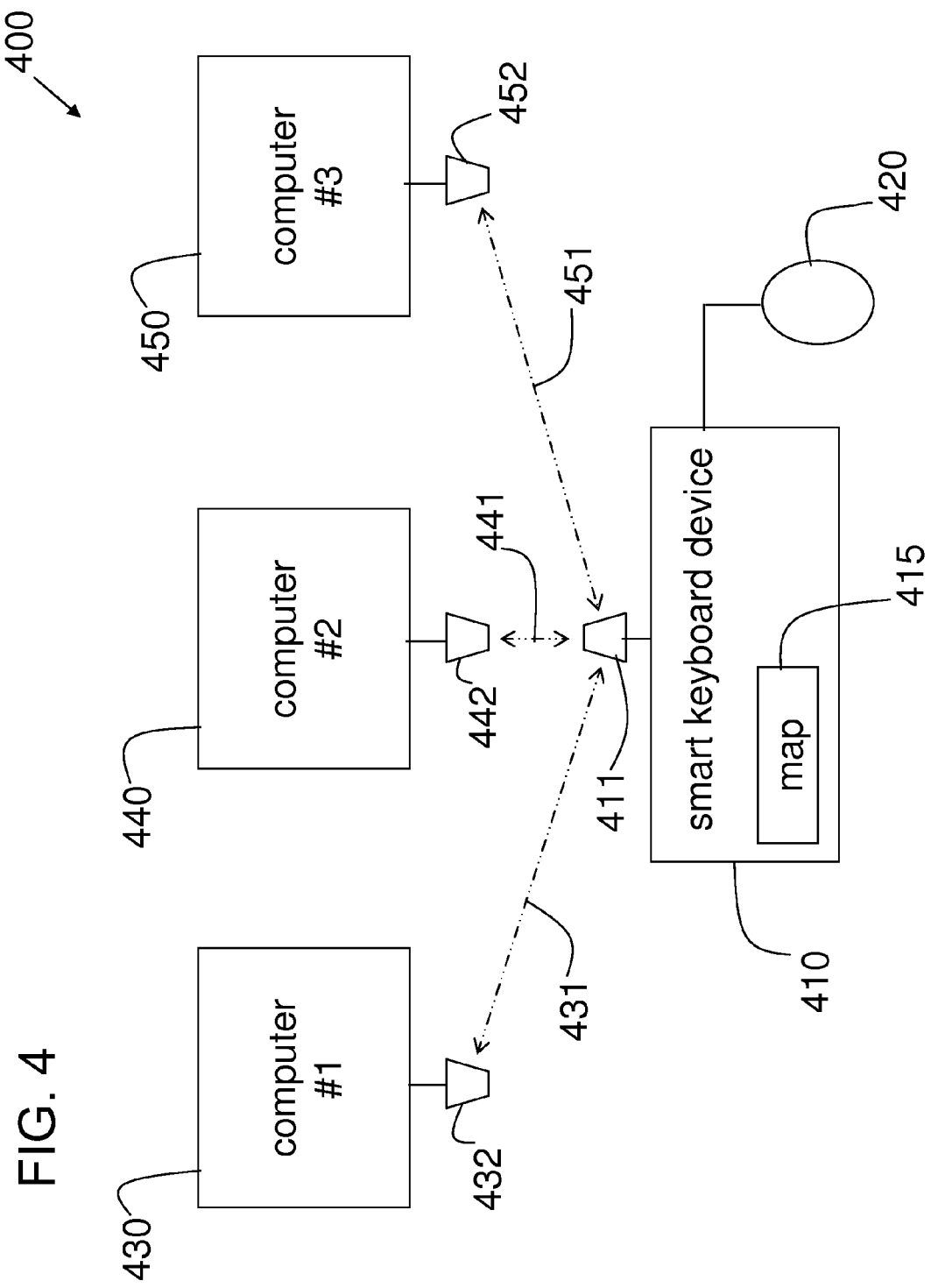
FIG. 4 illustrates a second example embodiment of a system for providing single user-interface control of multiple computers and displays using the method of FIG. 3.

FIG. 4 illustrates a second example embodiment of a system 400 for providing single user-interface control of multiple computers and displays using the method 300 of FIG. 3. The system 400 includes a smart keyboard device 410 storing a configuration map 415, and a computer mouse 420 operatively connected to the keyboard device 410. The system 400 further includes a first computer 430, a second computer 440, and a third computer 450 each capable of being operatively connected to the smart keyboard device 410 via a direct communication link. Each computer 430, 440, and 450 may have one or more displays or monitors.

The direct communication link 431 is a direct wireless connection (e.g., a wireless USB connection or a Bluetooth® connection) between the smart keyboard device 410 and the first computer 430. The direct communication link 441 is a direct wireless connection (e.g., a wireless USB connection or a Bluetooth® connection) between the smart keyboard device 410 and the second computer 440. The direct communication link 451 is a direct wireless connection (e.g., a wireless USB connection or a Bluetooth® connection) between the smart keyboard device 410 and the third computer 450. The direct wireless connections may be based on, for example, radio frequency technology or infrared technology. Other wireless technologies may be possible as well, in accordance with other embodiments of the present invention. In accordance with an embodiment of the present invention, the smart keyboard device 410 functionally connects to only one of the computers at a time, dependent upon a current tracked position of the computer mouse 420 with respect to the configuration map 415, as previously discussed herein.

In accordance with an embodiment of the present invention, the direct wireless connections are facilitated by a USB transmitter 411 of the smart keyboard device 410, plugged into a USB port of the smart keyboard device, and USB receivers 432, 442, and 452 of the computers 430, 440, and 450, respectively, plugged into respective USB ports of the computers. Single user-interface control of the system 400 functions in a similar manner to that of the system 100 of FIG. 1, except that the direct communication links are wireless in the system 400 of FIG. 4.

In order to distinguish between the various computers, any wireless message transmission from the smart keyboard device 400 includes an identification code, an address, or a frequency that is unique to the current computer to communicate with based on the current mouse position and the configuration map 415. A computer (430, 440, or 450) only responds to a message from the smart keyboard device 410 if that message includes the correct identification code, address, or frequency for that computer. Furthermore, messages between the smart keyboard device 410 and the computers (430, 440, or 450) may be encrypted by the smart keyboard device 410 and subsequently decrypted by the receiving computer to provide security, in accordance with an embodiment of the present invention. The smart keyboard device 410 includes at least one processor and software routines or applications for generating the configuration map and for operating with the multiple computers and displays in a manner as described herein.

Figure 5:
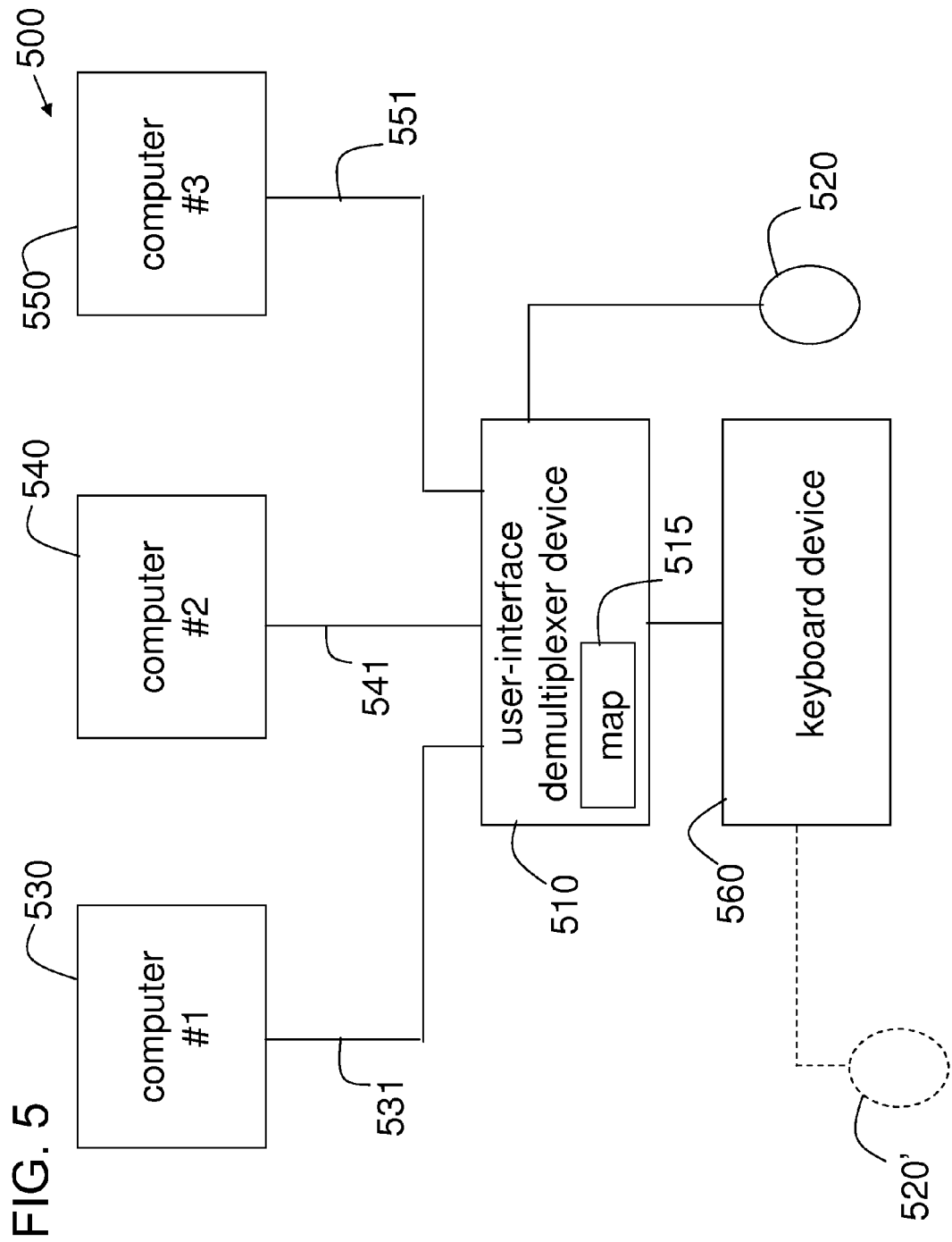
FIG. 5 illustrates a third example embodiment of a system for providing single user-interface control of multiple computers and displays.

FIG. 5 illustrates a third example embodiment of a system 500 for providing single user-interface control of multiple computers and displays. The system 500 includes a user-interface demultiplexer device 510 storing a configuration map 515, and a computer mouse 520 operatively connected to the user-interface demultiplexer device 510. The system 500 also includes a keyboard device 560 operatively connected to the user-interface demultiplexer device 510. The system 500 further includes a first computer 530, a second computer 540, and a third computer 550 each capable of being operatively connected to the user-interface demultiplexer device 510 via a direct communication link. Each computer 530, 540, and 550 may have one or more displays or monitors.

The keyboard device 560 provides traditional keyboarding capability. The user-interface demultiplexer device 510 provides an interface to the computer mouse 520 and is capable of automatically tracking a current mouse position of the computer mouse 520, mapping mouse position of the computer mouse 520 to display position of at least two computers, and automatically directing the current mouse position of the computer mouse 520, any current mouse command of the computer mouse 520, and any current keyboard command of the keyboard device 560 directly to one of the computers. As an option, a computer mouse 520' may instead interface to the keyboard device 560 and the mouse commands and positions are passed to the user-interface demultiplexer device 510 by the keyboard device 560.

The direct communication link 531 is a direct hardware connection (e.g., a USB cable or a PS/2 cable) between the user-interface demultiplexer device 510 and the first computer 130. The direct communication link 541 is a direct hardware connection (e.g., a USB cable or a PS/2 cable) between the user-interface demultiplexer device 510 and the second computer 540. The direct communication link 551 is a direct hardware connection (e.g., a USB cable or a PS/2 cable) between the user-interface demultiplexer device 510 and the third computer 550. In accordance with an embodiment of the present invention, the user-interface demultiplexer device 510 functionally connects to only one of the computers at a time, dependent upon a current tracked position of the computer mouse 520 with respect to the configuration map 515, as will be discussed in more detail herein.

Figure 6:
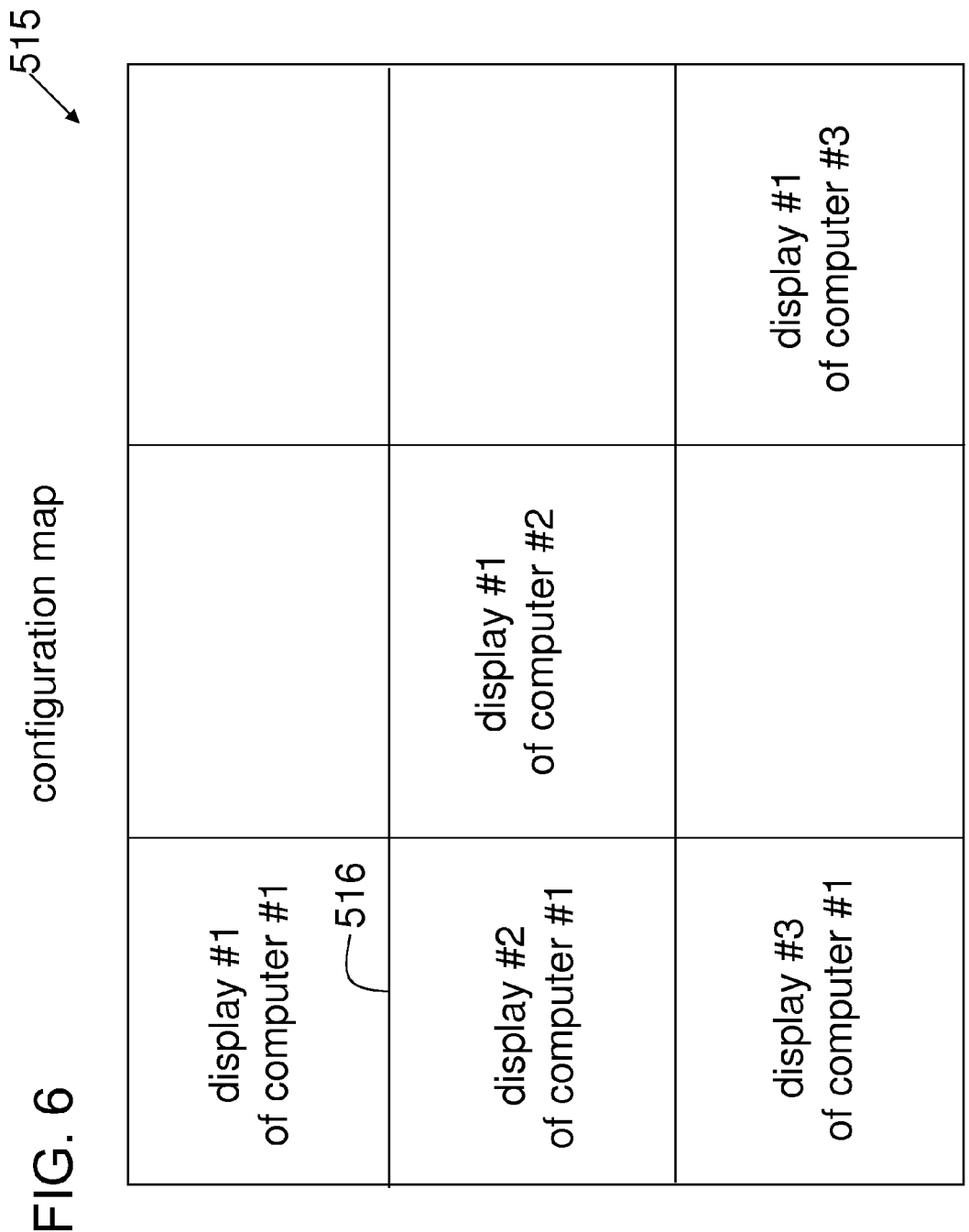
FIG. 6 illustrates a second example embodiment of a configuration map used in the system of FIG. 5.

FIG. 6 illustrates a second example embodiment of a configuration map 515 used in the system 500 of FIG. 5. The configuration map 515 is generated by a user using a configuration software routine or application within the user-interface demultiplexer device 510 in conjunction with, for example, one of the computers 530, 540, or 550. As such, the user-interface demultiplexer device 510 includes a processor for running the configuration software routine or application. The configuration software routine or application allows the user to define the dimensions of the matrix of the configuration map (e.g., 3×3) and then define how many displays each computer has and the relative locations of those displays with respect to each other, and store the resultant configuration map 515 in a memory of the user-interface demultiplexer device 510.

In FIG. 6, the configuration map 515 is a 3×3 matrix defining the relative display regions of the various computers as well as the absolute display region of any computer display. Referring to FIG. 6, the first computer 530 (computer #1) has three displays (display #1, display #2, and display #3). The second computer 540 (computer #2) has one display (display #1). The third computer 550 (computer #3) has only one display (display #1). According to the configuration map 515, display #1, display #2, and display #3 of the first computer 530 are defined as being on the left side of the matrix with display #1 being above display #2 and display #2 being above display #3, where display #1, display #2, and display #3 are defined at the upper, middle, and lower left relative matrix positions, respectively. Furthermore, display #1 of the second computer 540 is defined as being in the middle of the matrix. Finally, display #1 of the third computer 550 is defined as being on the right side of the matrix with display #1 being defined at the lower right relative matrix position. These relative positions of the various displays defined by the user in the configuration map 515 should correspond, at least roughly, to the actual physical layout of the various computer displays in the real world for maximum user effectiveness.

The absolute (x, y) dimensions of each defined display region may vary from display to display and may be defined by the user when generating the configuration map 515. Such absolute display dimensions may depend on the actual physical characteristics of the displays being employed by the various computers, including display size, display resolution, and number of displays. In accordance with an embodiment of the present invention, the display characteristics may be read by the user-interface demultiplexer device 510 from each computer 530, 540, and 550 over each interface 531, 541, and 551 and used by the user-interface demultiplexer device 510 and the user when generating the configuration map 515 using the configuration software routine or application. Each computer 530, 540, and 550 may include, for example, an installed USB driver to provide the display characteristics.

The user-interface demultiplexer device 510 is capable of tracking the position of the computer mouse 520 with respect to the configuration map 515 using a control software routine or application. As the position of the computer mouse 520 is tracked by the user-interface demultiplexer device 510, the current position of the mouse is mapped to a position on one of the displays of one of the computers using the configuration map 515. For example, if the current mouse position corresponds to a position within the matrix region of the configuration map 515 defined for display #1 of computer #2 then, when the user of the mouse 520 moves the mouse far enough to the left, the displayed mouse cursor transitions from display #1 of computer #2 (i.e., computer 540) to display #2 of computer #1 (i.e., computer 530). Similarly, if the current mouse position is then moved far enough downward, the displayed mouse cursor transitions from display #2 of computer #1 (i.e., computer 530) to display #3 of computer #1 (i.e., computer 530). As a result, the relative movement of the computer mouse 520 coupled with the configuration map 515 as operated upon by the user-interface demultiplexer device 510 determines on which physical display of which computer the mouse cursor appears. The user-interface demultiplexer device 510 transmits the current mouse position to the appropriate computer.

As long as the mouse 520 moves only within the defined two-dimensional (x, y) boundaries of any one display for any one computer, as defined by the configuration map 515, then the mouse cursor is displayed at the current mouse position on that display and the mouse commands from the mouse 520 and keyboard commands from the keyboard device 560 are directed to that computer. Only when a display boundary line (e.g., boundary line 516) is crossed, as defined by the configuration map 515, will the displayed mouse cursor transition from one display to another. Furthermore, when the displayed mouse cursor transitions from one display to another, mouse commands from the mouse 520 and keyboard commands from the keyboard device 560 are automatically re-directed to the corresponding computer and display as defined by the configuration map 515 by the user-interface demultiplexer device 510. The re-direction capability is accomplished by turning off a direct communication link from the user-interface demultiplexer device 510 to the current computer, and turning on another direct communication link from the user-interface demultiplexer device 510 to another computer. For example, the direct communication link 541 may be turned off between the user-interface demultiplexer device 510 and computer #2 (i.e., computer 540), and the direct communication link 531 may be turned on between the user-interface demultiplexer device 510 and computer #1 (i.e., computer 530) as the mouse 520 is moved to transition between the two. The re-direction is accomplished automatically, without the user having to manually flip a switch or push a button, for example.

In accordance with an embodiment of the present invention, the automatic re-direction capability is facilitated by a de-multiplexing capability within the user-interface demultiplexer device 510, where signals or data input from the mouse 520 and keyboard device 560 are directed to one of many outputs. The general concept of de-multiplexing is well known in the electronic arts.

Figure 7:
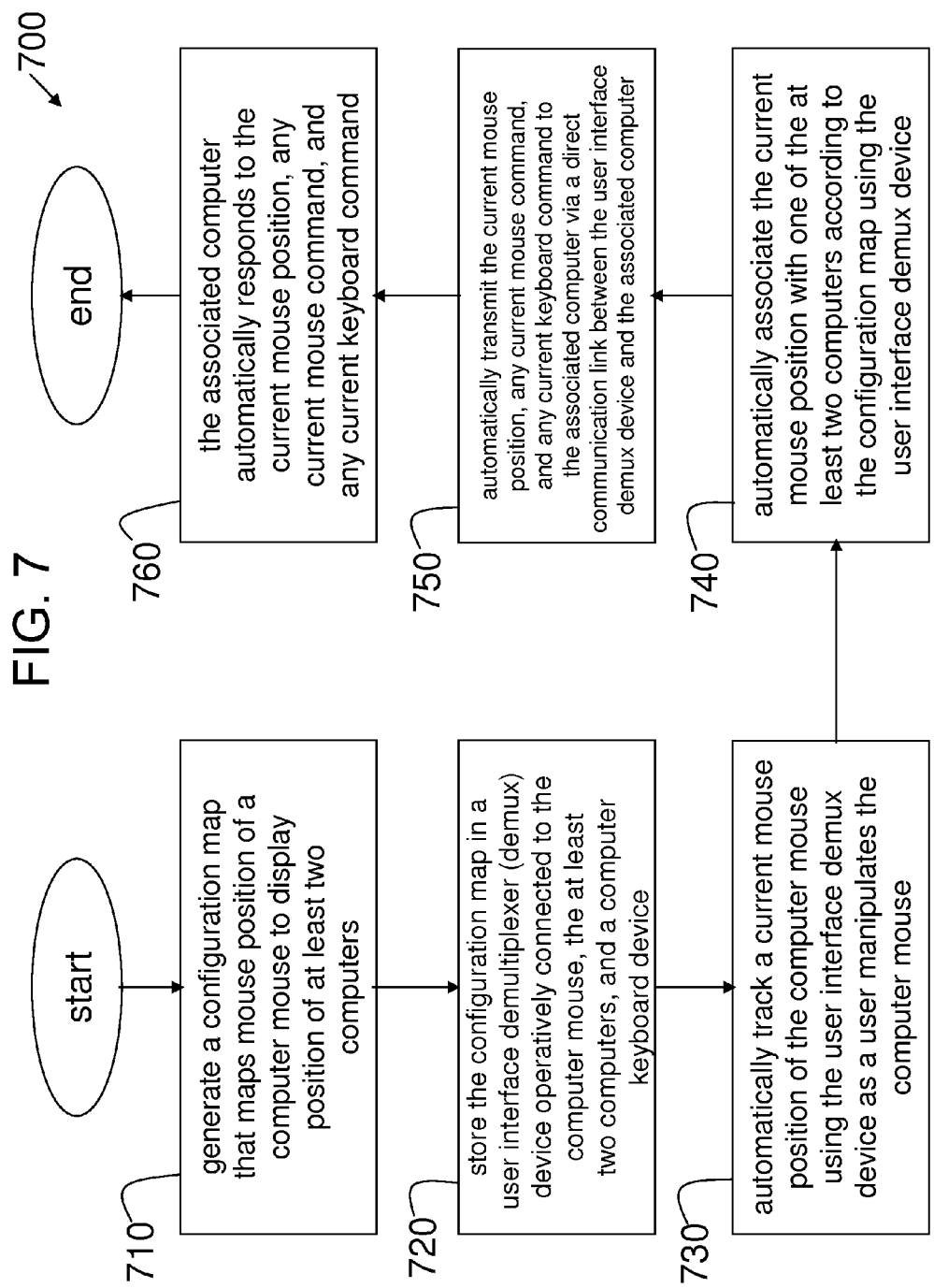
FIG. 7 is a flow chart of an embodiment of a method for providing single user-interface control of multiple computers and displays using the system of FIG. 5.

FIG. 7 is a flow chart of an embodiment of a method 700 for providing single user-interface control of multiple computers and displays using the system 500 of FIG. 5. In step 710, a configuration map 515 is generated that maps mouse position of a computer mouse 520 to display position of at least two computers. In step 720, the configuration map 515 is stored in a user-interface demultiplexer device 510 operatively connected to the computer mouse 520, a computer keyboard device 560, and the at least two computers. In step 730, a current mouse position of the computer mouse 520 is automatically tracked using the user-interface demultiplexer device 510 as a user manipulates the computer mouse 520. In step 740, the current mouse position is automatically associated with one of the at least two computers according to the configuration map 515 using the user-interface demultiplexer device 510. In step 750, the current mouse position, any current mouse command, and any current keyboard command are automatically transmitted to the associated computer via a direct communication link between the user-interface demultiplexer device 510 and the associated computer. In step 760, the associated computer automatically responds to the current mouse position, any current mouse command, and any current keyboard command.

Figure 8:
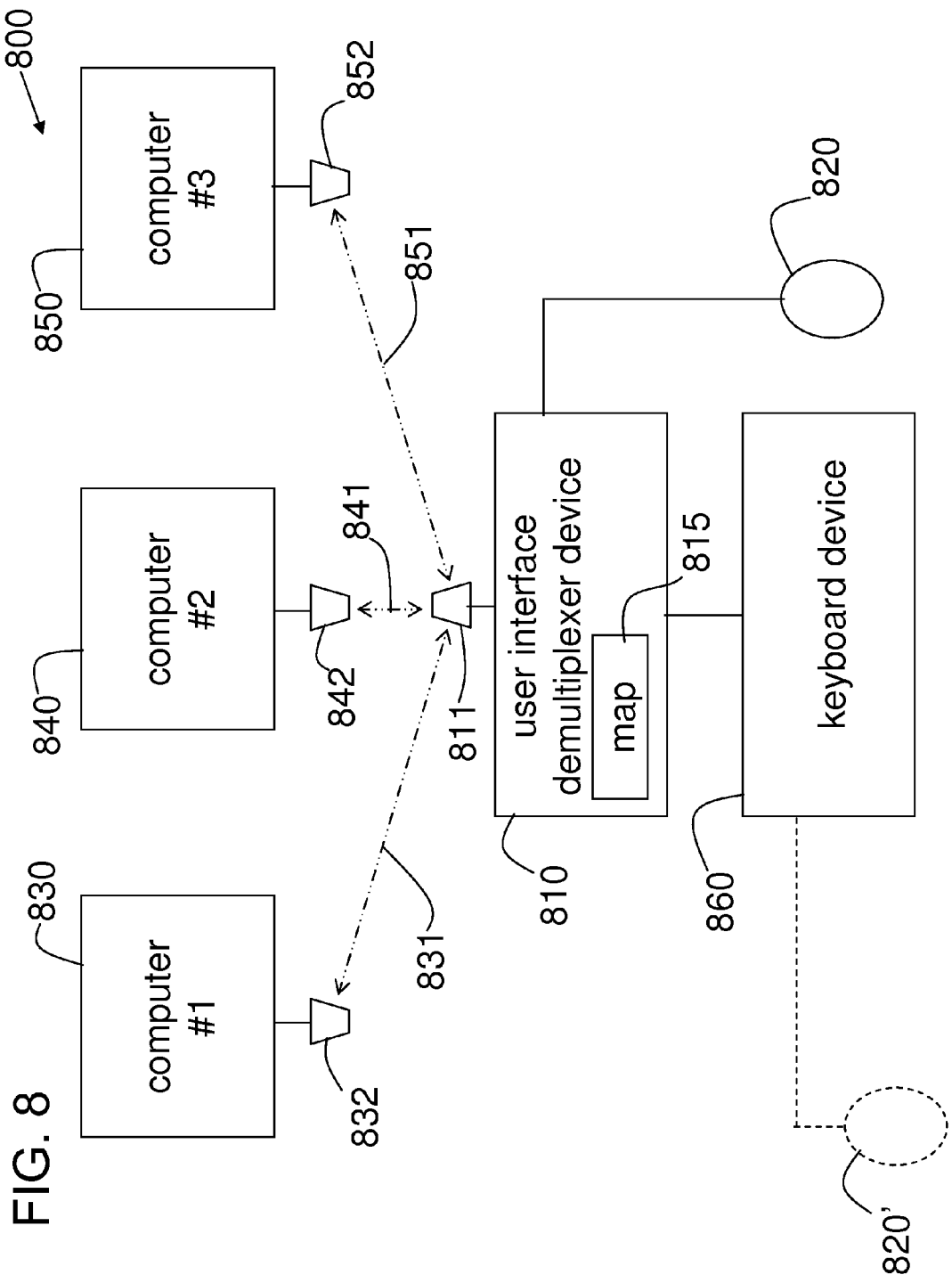
FIG. 8 illustrates a fourth example embodiment of a system for providing single user-interface control of multiple computers and displays using the method of FIG. 7.

FIG. 8 illustrates a fourth example embodiment of a system 800 for providing single user-interface control of multiple computers and displays using the method 700 of FIG. 7. The system 800 includes a user-interface demultiplexer device 810 storing a configuration map 815, and a computer mouse 820 operatively connected to the user-interface demultiplexer device 810. The system 800 also includes a computer keyboard device 860 operatively connected to an input of the user-interface demultiplexer device 810. The system 800 further includes a first computer 830, a second computer 840, and a third computer 850 each capable of being operatively connected to the user-interface demultiplexer device 810 via a direct communication link. Each computer 830, 840, and 850 may have one or more displays or monitors.

The direct communication link 831 is a direct wireless connection (e.g., a wireless USB connection or a Bluetooth® connection) between the user-interface demultiplexer device 810 and the first computer 830. The direct communication link 841 is a direct wireless connection (e.g., a wireless USB connection or a Bluetooth® connection) between the user-interface demultiplexer device 810 and the second computer 840. The direct communication link 851 is a direct wireless connection (e.g., a wireless USB connection or a Bluetooth® connection) between the user-interface demultiplexer device 810 and the third computer 850. The direct wireless connections may be based on, for example, radio frequency technology or infrared technology. Other wireless technologies may be possible as well, in accordance with other embodiments of the present invention. In accordance with an embodiment of the present invention, the user-interface demultiplexer device 810 functionally connects to only one of the computers at a time, dependent upon a current tracked position of the computer mouse 820 with respect to the configuration map 815, as previously discussed herein.

In accordance with an embodiment of the present invention, the direct wireless connections are facilitated by a USB transmitter 811 of the user-interface demultiplexer device 810, plugged into a USB port of the user-interface demultiplexer device 810, and USB receivers 832, 842, and 852 of the computers 830, 840, and 850, respectively, plugged into respective USB ports of the computers. Single user-interface control of the system 800 functions in a similar manner to that of the system 500 of FIG. 5, except that the direct communication links are wireless in the system 800 of FIG. 8. As an option, a computer mouse 820' may instead interface to the keyboard device 860 and the mouse commands and positions are passed to the user-interface demultiplexer device 810 by the keyboard device 860.

In order to distinguish between the various computers, any wireless message transmission from the user-interface demultiplexer device 810 includes an identification code, an address, or a frequency that is unique to the current computer to communicate with based on the current mouse position and the configuration map 815. A computer (830, 840, or 850) only responds to a message from the user-interface demultiplexer device 810 if that message includes the correct identification code, address, or frequency for that computer. Furthermore, messages between the user-interface demultiplexer device 810 and the computers (830, 840, or 850) may be encrypted by the user-interface demultiplexer device 810 and subsequently decrypted by the receiving computer to provide security, in accordance with an embodiment of the present invention. The user-interface demultiplexer device 810 includes at least one processor and software routines or applications for generating the configuration map and for operating with the multiple computers and displays in a manner as described herein.

In accordance with an alternative embodiment of the present invention, the re-directing or demultiplexing capability may reside in one of the at least two computers, instead of there being a smart keyboard device or a user-interface demultiplexer device providing such capability. In such an alternative embodiment, a traditional keyboard device and computer mouse interface to the designated computer having the re-directing or demultiplexing capability. The designated computer interfaces to the other computers of the system via, for example, USB connections (wired or wireless). The designated computer has a configuration map and directs mouse position, mouse commands, and keyboard commands to one of itself or one of the other computers, dependent on current mouse position and the configuration map as previously described herein.

In accordance with an alternative embodiment of the present invention, the keyboard and mouse may reside in a single integrated unit. The single integrated unit may internally include the re-directing or demultiplexing capability described herein (i.e., a smart device), or a separate external user-interface demultiplexer device may be provided to interface to the integrated keyboard and mouse unit. In accordance with another alternative embodiment of the present invention, a mouse is present but a keyboard is not present. The mouse may internally include the re-directing or demultiplexing capability described herein (i.e., a smart mouse), or a separate external user-interface demultiplexer device may be provided to interface to the mouse. In accordance with yet another alternative embodiment of the present invention, a keyboard is present but a mouse is not present. The keyboard may internally include the re-directing or demultiplexing capability described herein (i.e., a smart keyboard), or a separate external user-interface demultiplexer device may be provided to interface to the keyboard.

In accordance with various other alternative embodiments of the present invention, the mouse and/or keyboard may be replaced with other peripheral computer devices capable of interfacing to a computer such as, for example, a touchpad mouse, a 3D orb, a track ball, a tablet computer, an electronic pen or stylus, a joy stick, a gaming wand, or a scanner. Other devices which are capable of interfacing to a computer are possible as well. These other devices may internally include the re-directing or demultiplexing capability described herein (i.e., a smart device), or be capable of interfacing to a separate external user-interface demultiplexer device. Furthermore, these other devices may be separate, integrated, or standalone as similarly described above herein for the mouse and keyboard.

In summary, methods, systems, and devices providing single user-interface control of multiple computers and displays are disclosed. Direct communication links to multiple computers are provided to automatically transmit peripheral computer device position and peripheral computer device commands to one of the multiple computers using, for example, a single computer mouse and/or a single computer keyboard device, based on a configuration map which maps mouse position to display position of the multiple computers and displays as the current mouse position is automatically tracked.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

What is claimed is:

1. A method providing single user-interface control of multiple computers and displays, said method comprising:
   generating a configuration map that maps mouse position of a computer mouse to display position of at least two computers, wherein said configuration map defines relative display regions of said at least two computers and absolute display regions of said at least two computers;
   storing said configuration map in a computer keyboard device operatively connected to said computer mouse and said at least two computers;
   automatically tracking a current mouse position of said computer mouse using said computer keyboard device as a user manipulates said computer mouse;
   automatically associating said current mouse position with one of said at least two computers according to said configuration map using said computer keyboard device;
   automatically transmitting said current mouse position, any current mouse command, and any current keyboard command to said associated computer via a direct communication link between said computer keyboard device and said associated computer; and
   said associated computer automatically responding to said current mouse position, said any current mouse command, and said any current keyboard command.

2. The method of claim 1 further comprising:
   automatically associating a new current mouse position with another of said at least two computers according to said configuration map using said computer keyboard device;
   automatically transmitting said new current mouse position, any new current mouse command, and any new current keyboard command to said another associated computer via another direct communication link between said computer keyboard device and said another associated computer; and
   said another associated computer automatically responding to said new current mouse position, said any new current mouse command, and said any new current keyboard command.

3. The method of claim 1 wherein said direct communication link includes a direct hardware connection between said computer keyboard device and said associated computer.

4. The method of claim 2 wherein said another direct communication link includes a direct hardware connection between said computer keyboard device and said another associated computer.

5. The method of claim 1 wherein said direct communication link includes a direct wireless connection between said computer keyboard device and said associated computer.

6. The method of claim 2 wherein said another direct communication link includes a direct wireless connection between said computer keyboard device and said another associated computer.

7. The method of claim 1 wherein each of said at least two computers includes at least one display device.

8. A method providing single user-interface control of multiple computers and displays, said method comprising:
- generating a configuration map that maps mouse position of a computer mouse to display position of at least two computers, wherein said configuration map defines relative display regions of said at least two computers and absolute display regions of said at least two computers;
- storing said configuration map in a user-interface demultiplexer device operatively connected to a computer keyboard device, said computer mouse, and said at least two computers;
- automatically tracking a current mouse position of said computer mouse using said user-interface demultiplexer device as a user manipulates said computer mouse;
- automatically associating said current mouse position with one of said at least two computers according to said configuration map using said user-interface demultiplexer device;
- automatically transmitting said current mouse position, any current mouse command, and any current keyboard command to said associated computer via a direct communication link between said user-interface demultiplexer device and said associated computer; and
- said associated computer automatically responding to said current mouse position, said any current mouse command, and said any current keyboard command.

9. The method of claim 8 further comprising:
- automatically associating a new current mouse position with another of said at least two computers according to said configuration map using said user-interface demultiplexer device;
- automatically transmitting said new current mouse position, any new current mouse command, and any new current keyboard command to said another associated computer via another direct communication link between said user-interface demultiplexer device and said another associated computer; and
- said another associated computer automatically responding to said new current mouse position, said any new current mouse command, and said any new current keyboard command.

10. The method of claim 8 wherein said direct communication link includes a direct hardware connection between said user-interface demultiplexer device and said associated computer.

11. The method of claim 9 wherein said another direct communication link includes a direct hardware connection between said user-interface demultiplexer device and said another associated computer.

12. The method of claim 8 wherein said direct communication link includes a direct wireless connection between said user-interface demultiplexer device and said associated computer.

13. The method of claim 9 wherein said another direct communication link includes a direct wireless connection between said user-interface demultiplexer device and said another associated computer.

14. The method of claim 8 wherein each of said at least two computers includes at least one display device.

15. A system providing single user-interface control of multiple computers and displays, said system comprising:
- a computer mouse;
- at least two computers;
- a configuration map that maps mouse position of said computer mouse to display position of said at least two computers, wherein said configuration map defines relative display regions of said at least two computers and absolute display regions of said at least two computers; and
- a computer keyboard device storing said configuration map and being operatively connected to each of said at least two computers via direct communication links from said at least two computers to said computer keyboard device, said computer keyboard device further being operatively connected to said computer mouse,
- wherein said computer keyboard device is capable of automatically tracking a current mouse position of said computer mouse as a user manipulates said computer mouse,
- and wherein said computer keyboard device is capable of automatically associating said current mouse position with one of said at least two computers according to said configuration map,
- and wherein said computer keyboard device is capable of automatically transmitting said current mouse position, any current mouse command, and any current keyboard command to said associated computer via a direct communication link, of said direct communication links, between said computer keyboard device and said associated computer.

16. The system of claim 15 wherein said computer keyboard device is further capable of:
- automatically associating a new current mouse position with another of said at least two computers according to said configuration map;
- automatically transmitting said new current mouse position, any new current mouse command, and any new current keyboard command to said another associated computer via another direct communication link, of said direct communication links, between said computer keyboard device and said another associated computer.

17. The system of claim 15 wherein said direct communication link includes a direct hardware connection between said computer keyboard device and said associated computer.

18. The system of claim 16 wherein said another direct communication link includes a direct hardware connection between said computer keyboard device and said another associated computer.

19. The system of claim 15 wherein said direct communication link includes a direct wireless connection between said computer keyboard device and said associated computer.

20. The system of claim 16 wherein said another direct communication link includes a direct wireless connection between said computer keyboard device and said another associated computer.

21. The system of claim 15 wherein each of said at least two computers includes at least one display device.

22. A system providing single user-interface control of multiple computers and displays, said system comprising:
- a computer mouse;
- at least two computers;
- a configuration map that maps mouse position of said computer mouse to display position of said at least two computers, wherein said configuration map defines relative display regions of said at least two computers and absolute display regions of said at least two computers;
- a computer keyboard device; and
- a user-interface demultiplexer device storing said configuration map and being operatively connected to each of said at least two computers via direct communication links from said at least two computers to said user-interface demultiplexer device, said user-interface demultiplexer device further being operatively connected to said computer keyboard device and said computer mouse, wherein said user-interface demultiplexer device is capable of automatically tracking a current mouse position of said computer mouse as a user manipulates said computer mouse, and wherein said user-interface demultiplexer device is capable of automatically associating said current mouse position with one of said at least two computers according to said configuration map, and wherein said user-interface demultiplexer device is capable of automatically transmitting said current mouse position, any current mouse command, and any current keyboard command to said associated computer via a direct communication link, of said direct communication links, between said user-interface demultiplexer device and said associated computer.

23. The system of claim 22 wherein said user-interface demultiplexer device is further capable of:
automatically associating a new current mouse position with another of said at least two computers according to said configuration map;
automatically transmitting said new current mouse position, any new current mouse command, and any new current keyboard command to said another associated computer via another direct communication link, of said direct communication links, between said user-interface demultiplexer device and said another associated computer.

24. The system of claim 22 wherein said direct communication link includes a direct hardware connection between said user-interface demultiplexer device and said associated computer.

25. The system of claim 23 wherein said another direct communication link includes a direct hardware connection between said user-interface demultiplexer device and said another associated computer.

26. The system of claim 22 wherein said direct communication link includes a direct wireless connection between said user-interface demultiplexer device and said associated computer.

27. The system of claim 23 wherein said another direct communication link includes a direct wireless connection between said user-interface demultiplexer device and said another associated computer.

28. The system of claim 22 wherein each of said at least two computers includes at least one display device.

29. A smart computer keyboard device, said smart computer keyboard device comprising:
means for keyboarding;
means for interfacing to a computer mouse;
means for automatically tracking a current mouse position of said computer mouse as a user manipulates said computer mouse;
means for mapping mouse position of said computer mouse to display position of at least two computers, wherein said means for mapping defines relative display regions of said least two computers and absolute display regions of said at least two computers; and
means for automatically directing said current mouse position of said computer mouse, any current mouse command of said computer mouse, and any current keyboard command of said means for keyboarding directly to one of said at least two computers based on said means for mapping.

30. A smart user-interface demultiplexer device, said user-interface demultiplexer device comprising:
means for interfacing to a computer keyboard;
means for interfacing to a computer mouse;
means for automatically tracking a current mouse position of said computer mouse as a user manipulates said computer mouse;
means for mapping mouse position of said computer mouse to display position of at least two computers, wherein said means for mapping defines relative display regions of said at least two computers and absolute display regions of said at least two computers; and
means for automatically demultiplexing said current mouse position of said computer mouse, any current mouse command of said computer mouse, and any current keyboard command of said computer keyboard directly to one of said at least two computers based on said means for mapping.

31. A method providing single user-interface control of multiple computers and displays, said method comprising:
generating a configuration map that maps device position of a first peripheral computer device to display position of at least two computers, wherein said configuration map defines relative display regions of said at least two computers and absolute display regions of said at least two computers;
storing said configuration map in a second peripheral computer device operatively connected to said first peripheral computer device and said at least two computers;
automatically tracking a current device position of said first peripheral computer device using said second peripheral computer device as a user manipulates said first peripheral computer device;
automatically associating said current device position with one of said at least two computers according to said configuration map using said second peripheral computer device;
automatically transmitting said current device position, any current first peripheral computer device command, and any current second peripheral computer device command to said associated computer via a direct communication link between said second peripheral computer device and said associated computer; and
said associated computer automatically responding to said current device position, said any current first peripheral computer device command, and said any second peripheral computer device command.

32. The method of claim 31 wherein said first peripheral computer device includes any one of a movable computer mouse, a touchpad mouse, a keyboard, an integrated mouse and keyboard, an electronic pen or stylus, a 3D orb, a track ball, a tablet computer, a joy stick, a gaming wand, a user-interface demultiplexer device, and a scanner.

33. The method of claim 31 wherein said second peripheral computer device includes any one of a movable computer mouse, a touchpad mouse, a keyboard, an integrated mouse and keyboard, an electronic pen or stylus, a 3D orb, a track ball, a tablet computer, a joy stick, a gaming wand, a user-interface demultiplexer device, and a scanner.

34. The method of claim 31 wherein said first peripheral computer device and said second peripheral computer device are a single integrated unit.

35. The method of claim 34 wherein said single integrated unit includes one of a movable computer mouse, a touchpad mouse, a keyboard, an electronic pen or stylus, a 3D orb, a track ball, a tablet computer, a joy stick, a gaming wand, a user-interface demultiplexer device, and a scanner.

36. The method of claim 34 wherein said single integrated unit includes one of a keyboard/movable mouse combination, a keyboard/touch pad mouse combination, a keyboard/electronic pen combination, a tablet computer/touch pad mouse combination, a keyboard/3D orb combination, and a tablet computer/track ball combination.

37. The method of claim 31 wherein said first peripheral computer device includes one of a keyboard/movable mouse combination, a keyboard/touch pad mouse combination, a keyboard/electronic pen combination, a tablet computer/touch pad mouse combination, a keyboard/3D orb combination, and a tablet computer/track ball combination.

38. The method of claim 31 wherein said second peripheral computer device includes one of a keyboard/movable mouse combination, a keyboard/touch pad mouse combination, a keyboard/electronic pen combination, a tablet computer/touch pad mouse combination, a keyboard/3D orb combination, and a tablet computer/track ball combination.

39. The method of claim 31 further comprising:
automatically associating a new current device position with another of said at least two computers according to said configuration map using said second peripheral computer device;
automatically transmitting said new current device position, any new current first peripheral computer device command, and any new current second peripheral computer device command to said another associated computer via another direct communication link between said second peripheral computer device and said another associated computer; and
said another associated computer automatically responding to said new current device position, said any new current first peripheral computer device command, and said any new current second peripheral computer device command.

40. The method of claim 31 wherein said direct communication link includes a direct hardware connection between said second peripheral computer device and said associated computer.

41. The method of claim 39 wherein said another direct communication link includes a direct hardware connection between said second peripheral computer device and said another associated computer.

42. The method of claim 31 wherein said direct communication link includes a direct wireless connection between said second peripheral computer device and said associated computer.

43. The method of claim 39 wherein said another direct communication link includes a direct wireless connection between said second peripheral computer device and said another associated computer.

44. The method of claim 31 wherein each of said at least two computers includes at least one display device.

45. A system providing single user-interface control of multiple computers and displays, said system comprising:
a first peripheral computer device;
at least two computers;
a configuration map that maps device position of said first peripheral computer device to display position of said at least two computers, wherein said configuration map defines relative display regions of said at least two computers and absolute display regions of said at least two computers; and
a second peripheral computer device storing said configuration map and being operatively connected to each of said at least two computers via direct communication links from said at least two computers to said second peripheral computer device, said second peripheral computer device further being operatively connected to said first peripheral computer device,
wherein said second peripheral computer device is capable of automatically tracking a current device position of said first peripheral computer device as a user manipulates said first peripheral computer device,
and wherein said second peripheral computer device is capable of automatically associating said current device position with one of said at least two computers according to said configuration map,
and wherein said second peripheral computer device is capable of automatically transmitting said current device position, any current first peripheral computer device command, and any current second peripheral computer device command to said associated computer via a direct communication link, of said direct communication links, between said second peripheral computer device and said associated computer.

46. The system of claim 45 wherein said first peripheral computer device includes any one of a movable computer mouse, a touchpad mouse, a keyboard, an integrated mouse and keyboard, an electronic pen or stylus, a 3D orb, a track ball, a tablet computer, a joy stick, a gaming wand, a user-interface demultiplexer device, and a scanner.

47. The system of claim 45 wherein said second peripheral computer device includes any one of a movable computer mouse, a touchpad mouse, a keyboard, an integrated mouse and keyboard, an electronic pen or stylus, a 3D orb, a track ball, a tablet computer, a joy stick, a gaming wand, a user-interface demultiplexer device, and a scanner.

48. The system of claim 45 wherein said first peripheral computer device and said second peripheral computer device are a single integrated unit.

49. The system of claim 48 wherein said single integrated unit includes one of a movable computer mouse, a touchpad mouse, a keyboard, an electronic pen or stylus, a 3D orb, a track ball, a tablet computer, a joy stick, a gaming wand, a user-interface demultiplexer device, and a scanner.

50. The system of claim 48 wherein said single integrated unit includes one of a keyboard/movable mouse combination, a keyboard/touch pad mouse combination, a keyboard/electronic pen combination, a tablet computer/touch pad mouse combination, a keyboard/3D orb combination, and a tablet computer/track ball combination.

51. The system of claim 45 wherein said first peripheral computer device includes one of a keyboard/movable mouse combination, a keyboard/touch pad mouse combination, a keyboard/electronic pen combination, a tablet computer/touch pad mouse combination, a keyboard/3D orb combination, and a tablet computer/track ball combination.

52. The system of claim 45 wherein said second peripheral computer device includes one of a keyboard/movable mouse combination, a keyboard/touch pad mouse combination, a keyboard/electronic pen combination, a tablet computer/touch pad mouse combination, a keyboard/3D orb combination, and a tablet computer/track ball combination.

53. The system of claim 45 wherein said second peripheral computer device is further capable of:
automatically associating a new current device position with another of said at least two computers according to said configuration map;
automatically transmitting said new current device position, any new current first peripheral computer device command, and any new current second peripheral computer device command to said another associated computer via another direct communication link, of said direct communication links, between said second peripheral computer device and said another associated computer.

54. The system of claim 45 wherein said direct communication link includes a direct hardware connection between said second peripheral computer device and said associated computer.

55. The system of claim 53 wherein said another direct communication link includes a direct hardware connection between said second peripheral computer device and said another associated computer.

56. The system of claim 45 wherein said direct communication link includes a direct wireless connection between said second peripheral computer device and said associated computer.

57. The system of claim 53 wherein said another direct communication link includes a direct wireless connection between said second peripheral computer device and said another associated computer.

58. The system of claim 45 wherein each of said at least two computers includes at least one display device.

59. A smart peripheral computer device, said smart peripheral computer device comprising:
   means for automatically tracking a current device position of said smart peripheral computer device as a user manipulates said smart peripheral computer device;
   means for mapping device position of said smart peripheral computer device to display position of at least two computers, wherein said means for mapping defines relative display regions of said at least two computers and absolute display regions of said at least two computers; and
   means for automatically directing said current device position of said smart peripheral computer device and any current command of said smart peripheral computer device directly to one of said at least two computers based on said means for mapping.

60. A smart user-interface demultiplexer device, said user-interface demultiplexer device comprising:
   means for interfacing to a peripheral computer device;
   means for automatically tracking a current device position of said peripheral computer device as a user manipulates said peripheral computer device;
   means for mapping device position of said peripheral computer device to display position of at least two computers, wherein said means for mapping defines relative display regions of said at least two computers and absolute display regions of said at least two computers; and
   means for automatically demultiplexing said current device position of said peripheral computer device and any current command of said peripheral computer device directly to one of said at least two computers based on said means for mapping.

\* \* \* \* \*